US012576845B2

(12) United States Patent　　　(10) Patent No.: US 12,576,845 B2
Naserian et al.　　　　　　　　　(45) Date of Patent: Mar. 17, 2026

(54) SYSTEM AND METHOD TO PROVIDE TRAILER BACKING ASSISTANCE

(71) Applicant: GM Global Technology Operations LLC, Detroit, MI (US)

(72) Inventors: Mohammad Naserian, Windsor (CA); Allan Kenneth Lewis, Windsor (CA); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 250 days.

(21) Appl. No.: 18/461,962

(22) Filed: Sep. 6, 2023

(65) Prior Publication Data

US 2025/0074419 A1　　Mar. 6, 2025

(51) Int. Cl.
　B60W 30/18　　　(2012.01)
　B60W 50/10　　　(2012.01)
　B60W 50/14　　　(2020.01)
(52) U.S. Cl.
　CPC ...... B60W 30/18036 (2013.01); B60W 50/10 (2013.01); B60W 50/14 (2013.01); *B60W 2050/146* (2013.01); *B60W 2300/14* (2013.01); *B60W 2520/10* (2013.01); *B60W 2556/45* (2020.02); *B60W 2756/10* (2020.02)
(58) Field of Classification Search
　CPC ....... B60W 2050/146; B60W 2300/14; B60W 2520/10; B60W 2530/205; B60W 2556/45; B60W 2756/10; B60W 30/18036; B60W 50/10; B60W 50/14
　See application file for complete search history.

(56) References Cited

U.S. PATENT DOCUMENTS

| 2014/0249691 A1* | 9/2014 | Hafner | B62D 15/0285 |
| | | | 701/1 |
| 2018/0109762 A1* | 4/2018 | Aich | B62D 13/06 |
| 2023/0236593 A1* | 7/2023 | Overfield | B62D 15/0285 |
| | | | 701/2 |

FOREIGN PATENT DOCUMENTS

| DE | 10339075 A1 | 3/2005 |
| DE | 102015215573 A1 | 2/2016 |
| DE | 102021101380 A1 | 7/2021 |

* cited by examiner

*Primary Examiner* — Wade Miles
*Assistant Examiner* — Jerrod Irvin Davis
(74) *Attorney, Agent, or Firm* — Vivacqua Crane, PLLC

(57)　　　　ABSTRACT

A trailer backing assistance (TBA) application in a vehicle includes a vehicle attached to a trailer by a movable hitch. The TBA utilizes an HMI, sensors on the vehicle, a GPS system, and a remote computing system (RCS). A controller having a processor, memory, and input/output (I/O) communicates with the sensors, HMI, RCS and GPS via a V2I communications network. The memory stores the TBA which is executed by the processor. The TBA determines conditions have been satisfied, obtains and processes optical data from sensors and RCS, presents a vehicle environment view, prompts a vehicle operator for first and second inputs, calculates a current location of the vehicle, generates a planned path to a target location, presents an animation of the vehicle traversing the path, and continuously displays a live view of the trailer and hitch while actively adjusting on-screen instructions to guide the vehicle and trailer along the path.

18 Claims, 5 Drawing Sheets

SYSTEM AND METHOD TO PROVIDE TRAILER BACKING ASSISTANCE

INTRODUCTION

The present disclosure relates to advanced driver assistance systems (ADAS), and more particularly to driver assistance systems that assist vehicle operators in maneuvering vehicles while the vehicles are towing trailers. Vehicles are often used to tow trailers to carry equipment, goods, belongings, animals, other vehicles including boats and off-road vehicles, from place to place along roadways. Some trailers even function as shelters. In many situations, trailers need to be carefully maneuvered into locations that are physically constrained by other vehicles, infrastructure, trees, and the like. However, the process to maneuver a vehicle/trailer combination in reverse is non-trivial. Accordingly, trailer backup assistance systems have been developed to assist vehicle operators in appropriately and accurately guiding trailers in reverse. However, current trailer backup systems do not provide a target setpoint with adequate feedback to vehicle operators to assist vehicle operators in maneuvering the vehicle/trailer combination to a particular target location.

Thus, while current systems and methods for trailer backing assistance achieve their intended purpose, there is a need for a new and improved system and method of providing trailer backing assistance to vehicle operators that improves trailer backing accuracy from location-to-location while utilizing preexisting hardware, reducing computational burdens, and reducing component complexity while decreasing trailer backing difficulty by providing guidance feedback to the vehicle operator, and thereby improving customer confidence and satisfaction.

SUMMARY

According to several aspects of the present disclosure, a system for trailer backing assistance in a vehicle includes a vehicle attached to a trailer by a movable hitch. The system further includes one or more human-machine interfaces (HMIs) disposed within the vehicle and one or more sensors disposed on the vehicle and detecting an environment surrounding the vehicle. The system further includes a global positioning system (GPS) including one or more GPS satellites obtaining vehicle position information, a remote computing system, and a vehicle-to-infrastructure (V2I) communications network. The system further includes one or more controllers, each of the one or more controllers having a processor, a memory, and one or more input/output (I/O) ports. The I/O ports are in communication with the one or more sensors, the one or more HMIs, the GPS, and the remote computing system via the V2I communications network. The memory stores programmatic control logic. The processor executes the programmatic control logic. The programmatic control logic includes a trailer backing assistance application (TBA). The TBA includes at least a first, a second, a third, a fourth, a fifth, a sixth, a seventh, an eighth, a ninth, and a tenth programmatic control logic. The first control logic determines that a predefined set of conditions have been satisfied. The second control logic obtains optical data from one or more of the one or more sensors, and the remote computing system. The third control logic processes the optical data. The fourth control logic presents, via the HMI, a view of the environment surrounding the vehicle. The fifth control logic prompts a vehicle operator for a first input. The sixth control logic prompts the vehicle operator for a second input. The seventh control logic calculates a current location of the vehicle from the optical data and from GPS vehicle position information. The eighth control logic generates a planned path from the current location to a target location based on the first input and the second input. The ninth control logic presents, via the HMI, an animation of the vehicle traversing the planned path. The tenth control logic continuously displays, while the TBA is active, via the HMI, a live view of the trailer and hitch and actively and dynamically adjusts on-screen instructions that guide the vehicle operator in maneuvering the vehicle and trailer along the planned path from the current location to the target location.

In another aspect of the present disclosure the first control logic further includes control logic that determines that a speed of the vehicle is equal to or less than five kilometers-per-hour, and control logic that receives confirmation, from the vehicle operator, that the TBA should be engaged.

In yet another aspect of the present disclosure, the third control logic further includes control logic that performs feature detection, edge detection, edge filtering, and dimensional calculations on the optical data.

In yet another aspect of the present disclosure, the fourth control logic further includes control logic that presents a top-down view of the environment surrounding the vehicle based on data obtained from GPS, from optical data from the one or more sensors, and from image data stored in the remote computing system.

In yet another aspect of the present disclosure, the fifth control logic further includes control logic that prompts the vehicle operator to select a first goalpost. The first goalpost defines a first feature of the target location.

In yet another aspect of the present disclosure, the sixth control logic further includes control logic that prompts the vehicle operator to select at least one second goalpost. The at least one second goalpost defines at least one second feature of the target location. The second goalpost is different from and separated from the first goalpost by a distance that is greater than a width of the vehicle and a width of the trailer.

In yet another aspect of the present disclosure, the seventh control logic further includes control logic that calculates a current location of the vehicle from the optical data and from GPS vehicle position information, and control logic that generates the animation of the vehicle and trailer traversing the planned path.

In yet another aspect of the present disclosure, the eighth control logic further includes control logic that presents, via the HMI, the animation of the vehicle and trailer traversing the planned path, and control logic that presents, via the HMI, a confirmation prompt to the vehicle operator. In response to the confirmation prompt, the vehicle operator selectively approves the planned path.

In yet another aspect of the present disclosure, the eighth control logic further includes control logic that that, upon receiving a vehicle response to the confirmation prompt that rejects the planned path, generates a new planned path and presents the new planned path, via the HMI, an animation of the vehicle and trailer traversing the new planned path.

In yet another aspect of the present disclosure, the ninth control logic further includes control logic that, in response to receiving a vehicle operator response to the confirmation prompt in which the vehicle operator accepts the planned path or the new planned path, actively and continuously displays the live view of the trailer and hitch and actively and continuously displays a target trailer angle reference, a directional arrow, and the on-screen instructions that direct the vehicle operator how to manipulate a steering wheel of the vehicle, and actively and dynamically adjusts the directional arrow, the planned path, and the on-screen instructions according to a quantity of error between the target trailer angle reference and directional arrow until the vehicle and trailer have arrived at the target location.

In another aspect of the present disclosure, a method for trailer backing assistance for a vehicle attached to a trailer by a movable hitch includes accessing a trailer backing assistance application via one or more human-machine interfaces (HMIs) disposed within the vehicle. The method further includes detecting an environment surrounding the vehicle with one or more sensors disposed on the vehicle, and obtaining vehicle position information from global positioning system (GPS) satellites of a GPS. The method further includes utilizing a remote computing system, and utilizing a vehicle-to-infrastructure (V2I) communications network. The method further includes executing programmatic control logic stored within a memory of one or more controllers in communication with the one or more sensors via one or more input/output (I/O) ports and the V2I communications network, the one or more HMIs, the GPS, and the remote computing system. Each of the one or more controllers has a processor, the memory, and the I/O ports. The processor executes the programmatic control logic. The programmatic control logic includes a trailer backing assistance application (TBA). The TBA includes control logic for: determining that a predefined set of conditions have been satisfied, and obtaining optical data from one or more of the one or more sensors, and the remote computing system. The TBA further includes control logic for processing the optical data, presenting, via the HMI, a view of the environment surrounding the vehicle, prompting a vehicle operator for a first input, and prompting the vehicle operator for a second input. The TBA further includes control logic for calculating a current location of the vehicle from the optical data and from GPS vehicle position information, and generating and presenting a planned path from the current location to a target location based on the first input and the second input. The TBA further includes control logic for continuously displaying, via the HMI while the TBA is active, a live view of the trailer and hitch and actively and dynamically adjusting on-screen instructions that guide the vehicle operator in maneuvering the vehicle and trailer along the planned path from the current location to the target location.

In yet another aspect of the present disclosure the method further includes determining that a speed of the vehicle is equal to or less than five kilometers-per-hour; and receiving confirmation, from the vehicle operator, that the TBA should be engaged.

In yet another aspect of the present disclosure the method further includes performing feature detection, edge detection, edge filtering, and dimensional calculations on the optical data.

In yet another aspect of the present disclosure the method further includes presenting a top-down view of the environment surrounding the vehicle based on data obtained from GPS, from optical data from the one or more sensors, and from image data stored in the remote computing system.

In yet another aspect of the present disclosure the method further includes prompting the vehicle operator to select a first goalpost. The first goalpost defines a first feature of the target location. The method further includes prompting the vehicle operator to select at least one second goalpost. The at least one second goalpost defines at least one second feature of the target location. The second goalpost is different from and separated from the first goalpost by a distance that is greater than a width of the vehicle and a width of the trailer.

In yet another aspect of the present disclosure the method further includes calculating a current location of the vehicle from the optical data and from GPS vehicle position information, generating an animation of the vehicle and trailer traversing the planned path, and presenting, via the HMI, the animation of the vehicle and trailer traversing the planned path.

In yet another aspect of the present disclosure the method further includes presenting, via the HMI, a confirmation prompt to the vehicle operator, in response to the confirmation prompt, the vehicle operator selectively approves the planned path.

In yet another aspect of the present disclosure the method further includes, upon receiving a vehicle response to the confirmation prompt that rejects the planned path, generating a new planned path and presents the new planned path, via the HMI, an animation of the vehicle and trailer traversing the new planned path.

In yet another aspect of the present disclosure the method further includes, in response to receiving a vehicle operator response to the confirmation prompt in which the vehicle operator accepts the planned path or the new planned path, actively and continuously displaying the live view of the trailer and hitch and actively and continuously displays a target trailer angle reference, a directional arrow, and the on-screen instructions that direct the vehicle operator how to manipulate a steering wheel of the vehicle. The method further includes actively and dynamically adjusting the directional arrow, the planned path, and the on-screen instructions according to a quantity of error between the target trailer angle reference and directional arrow until the vehicle and trailer have arrived at the target location.

In still another aspect of the present disclosure a method for trailer backing assistance for a vehicle attached to a trailer by a movable hitch includes accessing a trailer backing assistance (TBA) application via one or more human-machine interfaces (HMIs) disposed within the vehicle. The method further includes detecting an environment surrounding the vehicle with one or more sensors disposed on the vehicle, and obtaining vehicle position information from global positioning system (GPS) satellites of a GPS. The method further includes utilizing a remote computing system, and utilizing a vehicle-to-infrastructure (V2I) communications network. The method further includes executing programmatic control logic stored within a memory of one or more controllers in communication, via one or more input/output (I/O) ports and the V2I communications network, with the one or more sensors, the one or more HMIs, the GPS, and the remote computing system. Each of the one or more controllers has a processor, the memory, and the I/O ports. The processor executes the programmatic control logic. The programmatic control logic includes the TBA. The TBA includes control logic for determining that a predefined set of conditions have been satisfied including: determining that a speed of the vehicle is equal to or less than five kilometers-per-hour, and receiving confirmation, from a vehicle operator, that the TBA should be engaged. The TBA further includes control logic for obtaining optical data from one or more of the one or more sensors, and the remote computing system. The TBA further includes control logic for processing the optical data including: performing feature detection, edge detection, edge filtering, and dimensional calculations on the optical data, and presenting, via the HMI, presenting a top-down view of the environment surrounding the vehicle based on data obtained from GPS, from optical data from the one or more sensors, and from image data stored in the remote computing system. The TBA further includes control logic for prompting the vehicle operator for a first goalpost and at least one second goalpost, wherein the first goalpost defines a first feature of a target location, and the at least one second goalpost defines at least one second feature of the target location. The second goalpost is different from and separated from the first goalpost by a distance that is greater than a width of the vehicle and a width of the trailer. The TBA further includes control logic for calculating a current location of the vehicle from the optical data and from GPS vehicle position information, and generating a planned path from the current location to a target location based on the first input and the second input. The TBA further includes control logic for generating an animation of the vehicle and trailer traversing the planned path, and presenting, via the HMI, the animation of the vehicle and trailer traversing the planned path. The method further includes prompting, via the HMI, the vehicle operator to approve the planned path, and upon receiving a vehicle operator response rejecting the planned path, generating a new planned path. The TBA further includes control logic for presenting the new planned path, via the HMI, an animation of the vehicle and trailer traversing the new planned path, and upon receiving a vehicle operator response accepting the planned path or the new planned path, actively and continuously displaying a live view of the trailer and hitch and actively and continuously displaying a target trailer angle reference, a directional arrow, and on-screen instructions that direct the vehicle operator how to manipulate a steering wheel of the vehicle. The TBA further includes control logic for actively and dynamically adjusting the directional arrow, the planned path, and the on-screen instructions according to a quantity of error between the target trailer angle reference and directional arrow until the vehicle and trailer have arrived at the target location.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
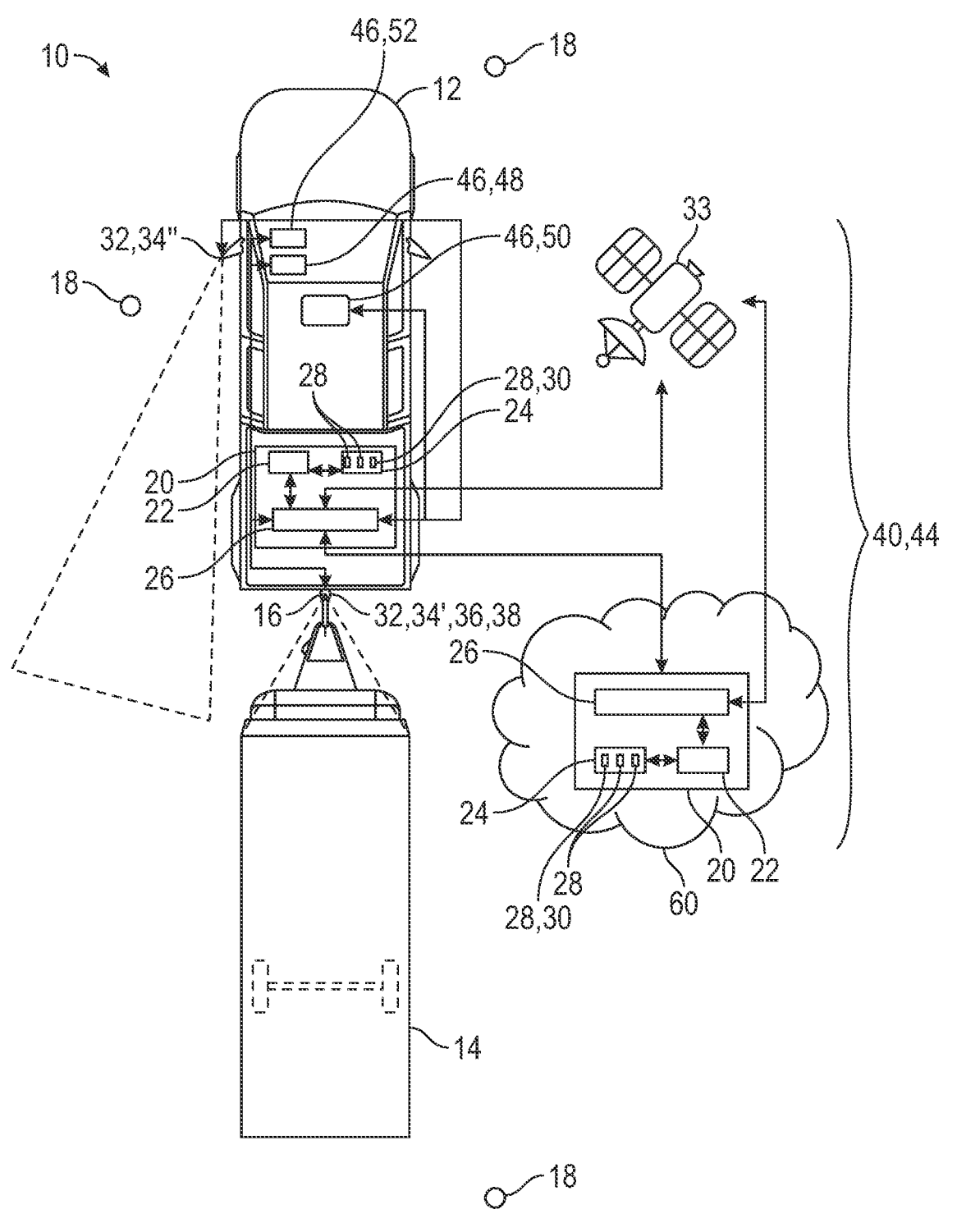
FIG. 1 is a schematic view of a system and method to provide trailer backing assistance according to an exemplary embodiment.

Referring to FIG. 1, a system 10 for trailer backing assistance is shown. The system 10 includes a vehicle 12 and a trailer 14 attached via a hitch 16 to the vehicle 12. While the vehicle 12 is shown as a passenger car or sport utility vehicle (SUV), it should be appreciated that the vehicle 12 may be any type of vehicle without departing from the scope or intent of the present disclosure. In some examples, the vehicle 12 may be a car, a truck, an SUV, a bus, a semi tractor, a tractor used in farming or construction or the like, a pushback tractor or tug, a baggage tractor or cargo tow tractor, or the like. Likewise, while the trailer 14 shown in FIG. 1 is a multi-axle trailer, the trailer 14 may be any of a wide variety of trailer 14 types without departing from the scope or intent of the present disclosure. In some examples, the trailer 14 may be an enclosed or open-air trailer 14 including flatbed trailers, dry vans, refrigerated trailers, lowboy trailers, fifth wheel campers, gooseneck trailers, luggage or cargo trailers, or the like. In further examples, the trailer 14 may be another vehicle 12 as described above, or a vehicle 12 such as a plane, helicopter, or other such aircraft. That is, a vehicle 12 may tow another vehicle 12 as a trailer 14, and multiple trailers 14 may be towed together in single file, or in parallel with one another.

The trailer 14 is movably affixed or mounted to the vehicle 12 via a hitch 16. The hitch 16 allows rotational movement of the trailer 14 relative to the vehicle 12, thus providing the trailer 14 and vehicle 12 means to negotiate turns while in motion. The hitch 16 depicted in FIG. 1 is a ball hitch, however it should be appreciated that other forms of hitches 16 may be used without departing from the scope or intent of the present disclosure. For example, the hitch 16 may be a ball hitch, a receiver hitch, a fifth wheel hitch, a gooseneck hitch, a pintle hitch, a bumper hitch, a weight distribution hitch, or the like. In several aspects, the hitch 16 operates as a pivot. It is desirable to manage trailer 14 rotational or angular articulation such that the trailer 14 does not physically contact the vehicle 12, another trailer 14 during, or environmental obstacles 18 during forward or reverse turns.

The system 10 includes one or more control modules 20. The control module 20 is a non-generalized, electronic control device having a preprogrammed digital computer or processor 22, non-transitory computer readable medium or memory 24 used to store data such as control logic, software applications, instructions, computer code, data, lookup tables, etc., and one or more input/output (I/O) ports 26. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium or memory 24 excludes wired, wireless, optical, or other communication links that transport transitory electrical or other signals. A non-transitory computer readable medium or memory 24 includes media where data can be permanently stored and media where data can be stored and later overwritten, such as a rewritable optical disc or an erasable memory device. Computer code includes any type of program code, including source code, object code, and executable code. The processor 22 is configured to execute the code or instructions. In some examples, the control module 20 may be a dedicated Wi-Fi controller or an engine control module, a transmission control module, a body control module, an infotainment control module, etc. The I/O ports 26 are configured to communicate via wired or wireless connections using Wi-Fi protocols under IEEE 802.11x, bluetooth communication protocols, radio frequency (RF) protocols, or the like.

In some examples, the control module 20 further includes one or more applications 28. An application 28 is a software program configured to perform a specific function or set of functions. The application 28 may include one or more computer programs, software components, sets of instructions, procedures, functions, objects, classes, instances, related data, or a portion thereof adapted for implementation in a suitable computer readable program code. The applications 28 may be stored within the memory 24 or in additional or separate memory. Examples of the applications 28 include audio or video streaming services, games, browsers, social media, suspension and engine control programs, body control programs, advanced driver assistance system programs, and the like. In a particular application 28 of the present disclosure, the system 10 includes a trailer backing assistance (TBA) application 30.

The system 10 further includes one or more sensors 32. The sensors 32 produce real-time positioning information regarding the location and/or movement of the trailer 14. The sensors 32 may include any of a wide variety of different types of sensors 32, including but not limited to: cameras 34, Light Detection and Ranging (LiDAR) sensors, Radio Detection and Ranging (RADAR) sensors, Sound Navigation and Ranging (SONAR) sensors, ultrasonic sensors, or combinations thereof. Further, the sensors 32 may have the ability to communicate with a Global Positioning System (GPS), and in particular, image data collected by satellites 33 in orbit around Earth, in order to more accurately and precisely report the location of the vehicle 12 and trailer 14 relative to environmental obstacles 18. In further examples, the sensors 32 may include wheel speed sensors disposed on one or more of the vehicle 12 and the trailer 14, a hitch angle estimation sensor 36 or a hitch angle estimation algorithm such as that taught by U.S. Pat. Nos. 10,346,705 and 11,560,026.

In additional examples, the sensors 32 may include inertial measurement units (IMUs) 38. IMUs 38 measure and report attitude or position, linear velocity, acceleration, and angular rates relative to a global reference frame using a combination of some or all of the following: accelerometers, gyroscopes, and magnetometers. In some examples, IMUs 38 may also utilize global positioning system (GPS) data to indirectly measure attitude or position, velocity, acceleration, and angular rates. When used in the system 10 of the present disclosure in conjunction with a vehicle 12 and a trailer 14, the IMUs 38 measure and report attitude or position, linear velocity, acceleration, and angular rates of the trailer 14 relative to the vehicle 12. The control modules 20 and sensors 32 may be linked to and communicate on one or more communications networks 40 including one or more of a vehicle-to-vehicle (V2V) communications network, a vehicle-to-infrastructure (V2I) communications network 44, or the like. For the sake of brevity, the term "infrastructure" is used to collectively refer to network entities capable of ad hoc wireless communications in the direct link or side link, and the cellular communication network owned by service providers, hence vehicle-to-network (V2N) communication is also intended to be included in the scope of V2I.

Figure 2:
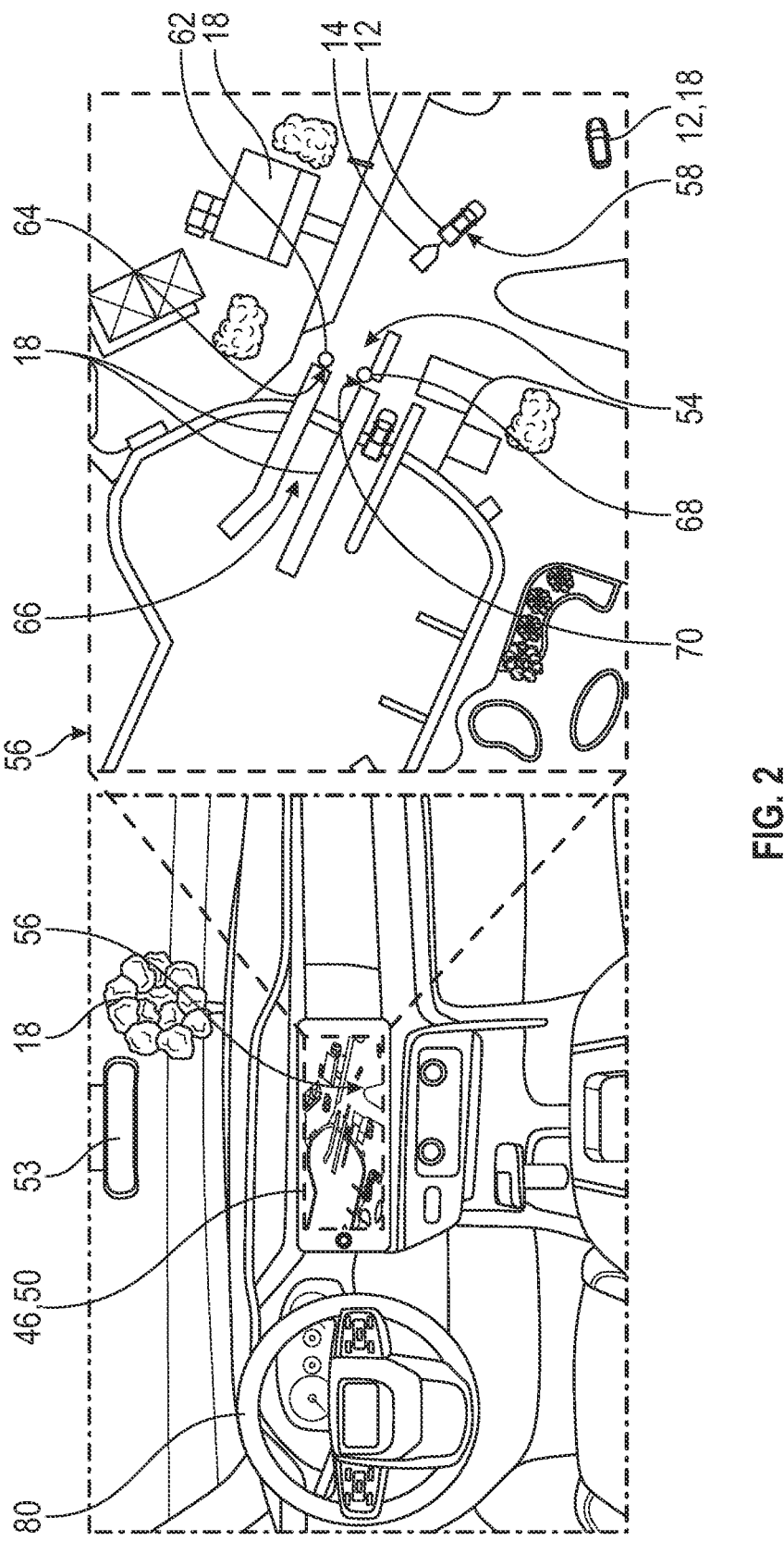
FIG. 2 is a perspective interior view of a vehicle, including a human-machine interface (HMI) displaying a top-down view of an environment surrounding a vehicle utilizing the system and method to provide trailer backing assistance of FIG. 1 according to an exemplary embodiment.
Figure 3:
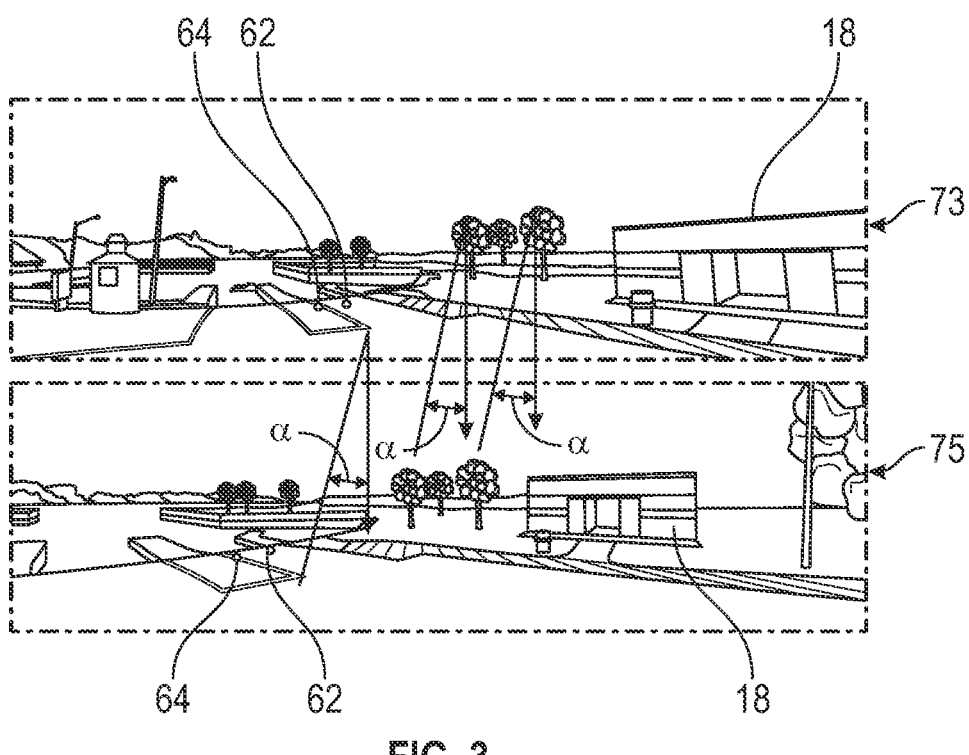
FIG. 3 is a perspective view of an environment surrounding the vehicle utilizing the system and method to provide trailer backing assistance of FIGS. 1 and 2 showing a conversion of a fish-eye view to an equirectangular view of the environment according to an exemplary embodiment.
Figure 4:
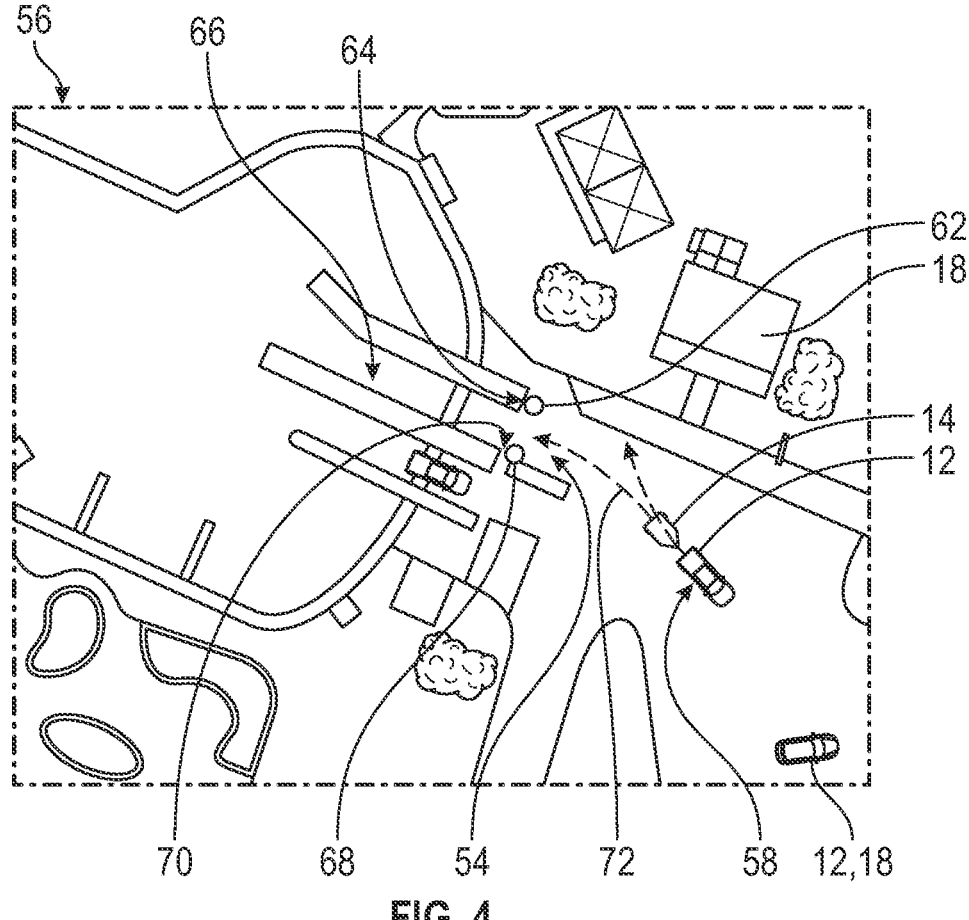
FIG. 4 is a top-down view of the environment surrounding the vehicle of FIG. 2 in which the system and method to provide trailer backing assistance have provided a planned path for a vehicle operator to follow according to an exemplary embodiment.

Referring now to FIGS. 2, 3, and 4 and with continuing reference to FIG. 1, the system 10 further includes an in-vehicle 12 human-machine interface (HMI) 46 to interact with vehicle 12 operators. In several aspects, the HMI 46 includes one or more devices capable of interacting with the vehicle 12 operator, such as a screen disposed within the vehicle 12 such as an instrument cluster 48, an infotainment screen 50, a heads-up display (HUD) 52, an interior rear view screen such as a rear view mirror augmented by a screen 53, or the like. However, it should be appreciated that other HMIs 46 are considered herein as well. For example, the HMI 46 may be a mobile device, such as a tablet computer, a mobile phone, or the like, and the HMI 46 may be provided by the vehicle 12 operator and temporarily mounted to or disposed on an interior passenger compartment component of the vehicle 12. In examples in which the HMI 46 is a mobile device as described above, it will be appreciated that at least a portion of the TBA 30 is carried out onboard the mobile device. In several aspects, the HMI 46 communicates with the control modules 20 via the I/O ports 26, and sends information to and receives information from the I/O ports 26 of the control modules 20, including during operation of the TBA 30.

In general, the TBA 30 assists a vehicle 12 operator in maneuvering a vehicle 12 and trailer 14 attached thereto by utilizing a path planning algorithm that determines a path 72 to a target location 54 while providing continuous and real-time feedback to the vehicle 12 operator to ensure that the trailer 14 arrives at the target location 54 without contacting environmental obstacles 18 en-route. More specifically, the TBA 30 includes a plurality of sub-routines or control logic portions that are stored in memory 24 of the control modules 20 and executed by the processor 22 while data is received, via the I/O ports 26, from the sensors 32 such as the cameras 34, hitch angle estimation sensor 36, IMUs 38, and/or satellites 33 reporting GPS data. The TBA 30 further includes a plurality of subroutines or control logic portions that cause data to be transmitted from the control modules 20 to the HMI 46 in order to assist the vehicle 12 operator in positioning and maneuvering the vehicle 12 and trailer 14.

In several aspects, the TBA 30 is initialized upon the occurrence of one or more specific conditions within a first control logic. These conditions include manual initialization by a vehicle 12 operator via the HMI 46, the operation of a physical button disposed in the interior of the vehicle 12. In further examples, the conditions may be automatically satisfied by sensors 32 equipped to the vehicle 12 and detecting that a trailer 14 is attached to the vehicle 12, and then that the vehicle 12 is being operated in reverse (i.e. a backing situation). Additional considerations or conditions may include vehicle 12 speed limitations, such as a requirement that the vehicle 12 be operated at a speed less than or equal to five kilometers per hour (5 kph), or the like.

Upon satisfying the one or more specific conditions, the system 10 utilizes the HMI 46 to present a prompt to the vehicle 12 operator for confirmation that the vehicle 12 operator desires that the TBA 30 be engaged. The prompt may be displayed on-screen on the HMI 46, dictated audibly through a stereo system of the vehicle 12, or the like. Upon receiving confirmation that the vehicle 12 operator desires to engage the TBA 30, the control module 20 executes a second control logic of the TBA 30 that utilizes the sensors 32 to scan the environment surrounding the vehicle 12 and trailer 14. The environmental scan may utilize a variety of different sensors 32 equipped to the vehicle 12. Environmental scan data received from the sensors 32 is then processed in one or more image or video-processing algorithms included within a third control logic.

In several aspects, the image or video-processing algorithms may include one or more of image capture algorithms that capture an image of the trailer 14 and perform image distortion corrections as needed to correct for camera 34 lens shape, and the like. Feature detection algorithms, such as Canny Edge algorithms, may then be used to perform feature detection within the image of the trailer 14. Similarly, edge filtering may be used to focus on vertical or horizontal edges found within the image of the trailer 14. Hough transforms may then be used to detect line targets in an image, and finally edges of the trailer 14 in the image of the trailer 14 are detected from line targets. The TBA 30 then calculates dimensions including a width of the trailer 14 based on known parameters including but not limited to: focal length and optical characteristics of a trailer hitch camera 34' of the vehicle 12, a position of the trailer hitch 16 relative to the trailer hitch camera 34', and/or focal length and optical characteristics of one or more side view cameras 34" and positions of the side view cameras 34" relative to the trailer hitch 16 and/or trailer 14, or the like.

Turning now to FIG. 2 and with continuing reference to FIG. 1, the TBA 30 then executes a fourth control logic that presents, via the HMI 46, the vehicle 12 operator with a top-down view 56 of the current location 58 of the vehicle 12 and trailer 14 based on GPS position, GNSS coordinate and/or saved position information from a set of optical scans of the current location of the vehicle 12 and trailer 14. It should be appreciated, however, that the exemplary top-down view of the current location 58 is not intended to be limiting. The environment of the vehicle 12 may similarly be displayed in non-top-down format for use by the vehicle 12 operator while the TBA 30 is in use without departing from the scope or intent of the present disclosure. In several aspects, the set of optical scans of the current location may include optical scans performed by the sensors 32, including cameras 34 of the vehicle 12 and/or the optical scans of the current location may include or be augmented by optical data obtained by other vehicles 12, mobile devices, or the like, where the optical scans are then uploaded via the V2I network 44, to a remote cloud-based computing and/or storage system such as a cloud computing server 60 having one or more control modules 20 that may execute at least a portion of the TBA 30, or the like.

The TBA 30 then executes a fifth control logic that presents, via the HMI 46, a prompt to select a first goalpost 62 within the top-down view 56 of the current location 58 of the vehicle 12 and trailer 14. The first goalpost 62 is a physical constraint that the system 10 must navigate the trailer 14 around in order to successfully back the trailer 14 to the target location 54. The vehicle 12 operator may select the first goalpost 62 by identifying the goalpost 62 in the top-down view 56 of the current location 58 via a haptic input to the HMI 46, such as touching a point on the screen of the HMI 46. In the example shown in the figures, in which the cardinal direction North is at the top of the image, the first goalpost 62 is a South-side edge 64 of the North boat ramp 66.

Once the first goalpost 62 has been selected, the TBA 30 executes a sixth control logic that presents, via the HMI 46, a prompt to select a second goalpost 68 within the top-down view 56 of the current location 58 of the vehicle 12 and trailer 14. The second goalpost 68, like the first goalpost 62, is a physical constraint that the system 10 must navigate the trailer 14 around in order to successfully back the trailer 14 to the target location 54. The vehicle operator 12 may select the second goalpost 68 by identifying the second goalpost 68 in the top-down view 56 of the current location 58 via a haptic input to the HMI 46, such as touching a second point on the screen of the HMI 46. In the example shown in the figures, the second goalpost 68 is a North-side edge 70 of the North boat ramp 66. It should be appreciated that while only first and second goalposts 62, 68 have been described herein, additional goalposts may be selected, and that the additional goalposts may further define certain characteristics of the planned path 72 that the TBA 30 generates. For example, the vehicle 12 operator may select additional goalposts defining lamp posts, trees, vehicles, or the like within a parking area proximate the North boat ramp 66 without departing from the scope or intent of the present disclosure. However, for ease of explanation, the TBA 30 will generally be described herein with respect only to first and second goalposts 62, 68. It should be further appreciated that the first and second goalposts 62, 68 are different from one another, and separated from one another by a distance that is greater than either a width of the vehicle and/or a width of the trailer, or both.

Turning now more specifically to FIG. 3 and with continuing reference to FIGS. 1 and 2, while the TBA 30 is in the process of prompting the vehicle 12 operator to select the first and second goalposts 62, 68, the system 10 executes a seventh control logic that utilizes one or more video processing algorithms or control modules 20 to calculate the current location 58 of the vehicle 12 by pattern-matching vehicle 12 surroundings with image and location data stored within the cloud computing server 60. In several aspects, the video processing algorithms or control modules 20 calculate the current location 58 of the vehicle 12 and trailer 14 using one or more classical or learned detection algorithms such as scale invariant feature transforms (SIFT), speeded up robust feature (SURF), oriented fast and rotated brief (ORB), SuperPoint, and/or D2-Net for joint description and detection of features local to the vehicle 12 and trailer 14 within the images. The TBA 30 performs feature matching to find the nearest neighbors, filters outliers and using heuristic ratio tests, mutual tests, and learned classifier on set, the system 10 generates a position or pose estimation.

In some aspects, the vehicle 12 position or pose estimation is calculated by offsetting map data angles with respect to true North, with the mean value of feature point angles $\alpha$. To account for vehicle 12 camera 34 lens shape, such as fisheye lenses, the system 10 converts optical data obtained by the cameras 34 from fisheye 73 to equirectangular 75 in accordance with known processes.

In several aspects, as object avoidance is not required, a standard Graphical Information System (GIS) bearing angle is calculated. The system 10 assumes that a radius R is the mean radius of the Earth, L is the current longitude, $\theta$ is the current latitude, and $\beta$ is the bearing of the vehicle 12. Accordingly, a bearing from the current location 58 of the vehicle 12 to the target location 54 is defined as:

$$\beta = \text{atan } 2(X, Y) \qquad \qquad 1.$$

Where X and Y are two quantities that are calculated as:

$$X = \cos(\theta b) * \sin(\Delta L) \qquad \qquad 2$$

$$Y = \cos(\theta a) * \sin(\theta b) - \sin(\theta a) * \cos(\theta b) * \cos(\Delta L) \qquad 3$$

Since sharp turns are not feasible either kinematically or desirable from a feature perspective when towing a trailer 14, the TBA 30 utilizes a B-spline algorithm within an eighth control logic to generate the planned path 72 of the vehicle 12 and trailer 14 because the B-spline algorithm is highly tunable, calibratable, and is computationally efficient.

Figures 5, 6:
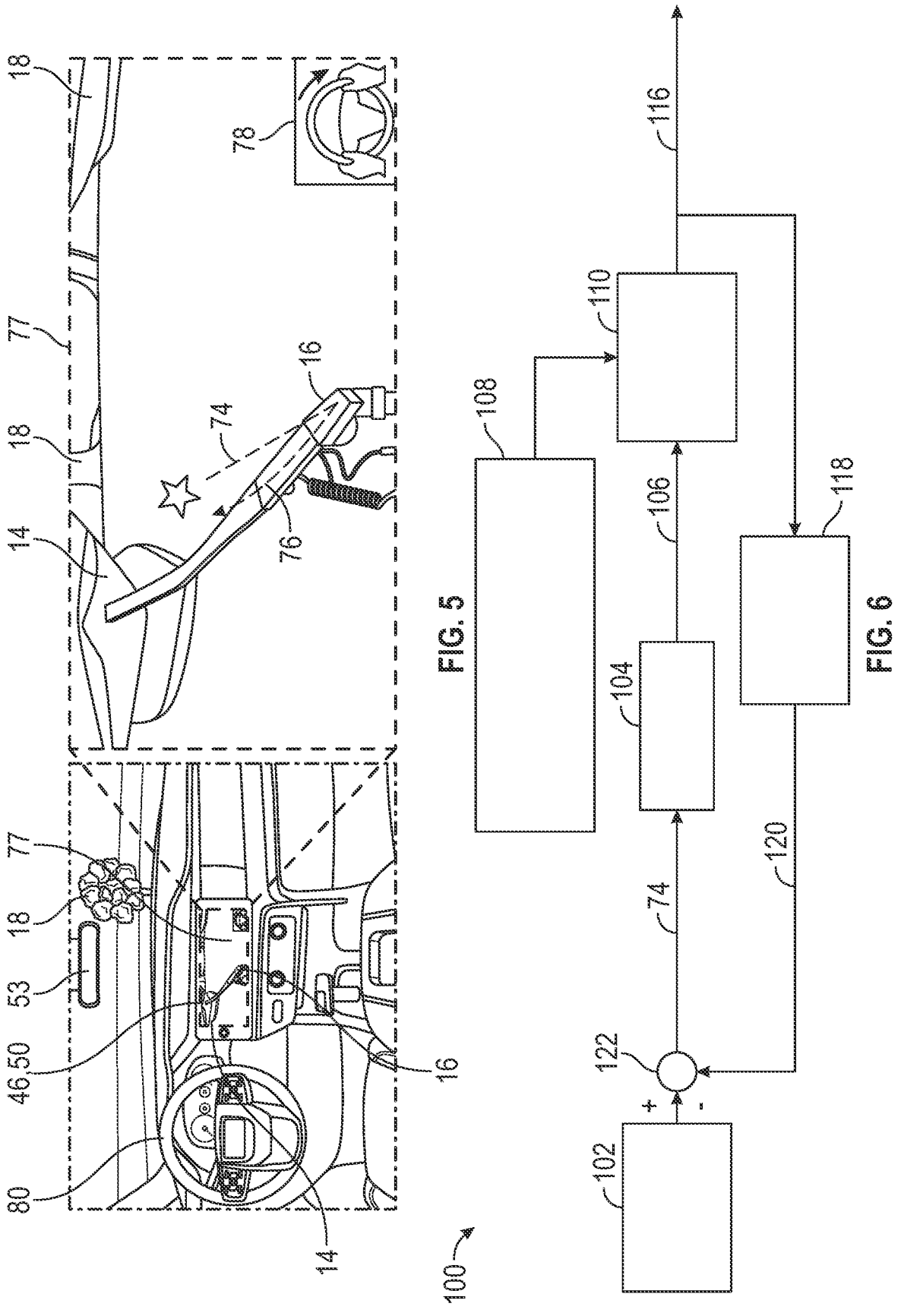
FIG. 5 is a perspective interior view of a vehicle, including the human-machine interface (HMI) displaying a trailer hitch view overlaid with maneuvering instructions instructing an operator of the vehicle utilizing the system and method to provide trailer backing assistance of FIGS. 1, 2, and 3 according to an exemplary embodiment.
FIG. 6 is a schematic diagram of a driver and automation based trailer angle control system portion of the system and method to provide trailer backing assistance of FIG. 1 according to an exemplary embodiment.

Turning now more specifically to FIGS. 4 and 5 and with continuing reference to FIGS. 1-3, upon identifying an appropriate path 72 for the vehicle 12 and trailer 14 to take between the current location 58 to the target location 54, the TBA 30 executes a ninth control logic that presents an animation of the calculated vehicle 12 and trailer 14 path 72 to the vehicle 12 operator via the HMI 46. The vehicle 12 operator then reviews the calculated path 72 and must approve the planned path 72 via an input to the HMI 46, before the TBA 30 engages to assist the vehicle 12 operator in maneuvering the vehicle 12 and trailer 14 to the target location 54 according to the planned path 72. Should the vehicle 12 operator not wish to utilize the planned path 72, the planned path 72 may be rejected via an on-HMI 46 prompt indicating as much. For example, the vehicle 12 operator may determine that one or more of the selected goalposts 62, 68 is inappropriate for some reason, or another vehicle 12 or other movable object may, while the planned path 72 was being planned, have entered into the path as an obstruction or obstacle, thereby rendering the planned path 72 unfeasible. When the vehicle 12 operator rejects the planned path 72, the TBA 30 presents the vehicle 12 operator another opportunity to select first and second goalposts 62, 68, re-plots a new planned path 72 as described hereinabove, displays an animation of the new planned path 72 and then offers the vehicle 12 operator an opportunity to accept or reject the new planned path 72.

Once the vehicle 12 operator has accepted the proposed planned path 72, the TBA 30 executes a tenth control logic that utilizes the HMI 46 to display a live trailer view 77 of the trailer 14 and hitch 16 obtained from the trailer hitch camera 34'. To assist the vehicle 12 operator in correctly maneuvering the vehicle 12 and trailer 14 along the planned path 72, the TBA 30 displays a target trailer angle reference 74, and a directional arrow 76 along with text and/or graphical instructions 78 instructing the vehicle 12 operator how to manipulate a steering wheel 80 of the vehicle 12. The system 10 continuously monitors the position of the trailer 14 relative to the vehicle 12, actively and dynamically adjusts the directional arrow 76 and text and/or graphical instructions 78 according to a quantity of error between the target trailer angle reference 74 and directional arrow 76. For example, the text and/or graphical instructions 78 may both visually indicate that the vehicle 12 operator should turn the steering wheel 80 to the right (i.e. clockwise), and a textual message may be overlayed or otherwise displayed on the HMI 46 stating "Turn Wheel Clockwise". Maneuvering instructions may also be played audibly through the stereo system of the vehicle 12. It should be appreciated that the text and/or graphical instructions 78 may be displayed individually, together, sequentially, or the like without departing from the scope or intent of the present disclosure.

Likewise, audible instructions may be played at any time during the use of the TBA 30 to maneuver the vehicle 12 and trailer 14 along the planned path 72.

Turning now to FIG. 6 and with continuing reference to FIGS. 1-5, the TBA 30 includes an eleventh control logic that includes an operator and automation-based trailer 14 angle control system 100. At block 102, the angle control system 100 generates the target trailer angle reference 74. The target trailer angle reference 74 is then displayed on-screen on the HMI 46. In response to the on-screen displayed target trailer angle reference 74, the vehicle 12 operator generates an input to the steering wheel 80 at block 104. The steering wheel 80 input alters a tire angle 106 of the vehicle 12. At block 108, sensors 32 of the vehicle 12 obtain live disturbance data from the vehicle 12 and/or trailer 14. The live disturbance data includes information about the surface on which the vehicle 12 and trailer 14 are located, vehicle 12 and/or trailer 14 tire inflation information, and the like. At block 110, the tire angle 106 and live disturbance information from block 108 are received by a vehicle dynamics system, which subsequently generates a change in the actual trailer angle 116 via actuators of the vehicle 12.

At block 118, the actual trailer angle 116 is observed by the sensors 32 of the vehicle 12 and the angle control system 100 executes a twelfth control logic that utilizes machine vision processing to generate an estimated trailer angle 120 output. At 122, the estimated trailer angle 120 output is then compared to the target trailer angle reference 74. The angle control system 100 operates continuously while the TBA 30 is in operation and in use to guide the vehicle 12 and trailer 14 along the planned path 72 to the target location 54. The system 100 operates continuously while the TBA 30 is in use to assist the vehicle 12 operator in correctly maneuvering the vehicle 12 and trailer 14 along the planned path 72.

Figure 7:
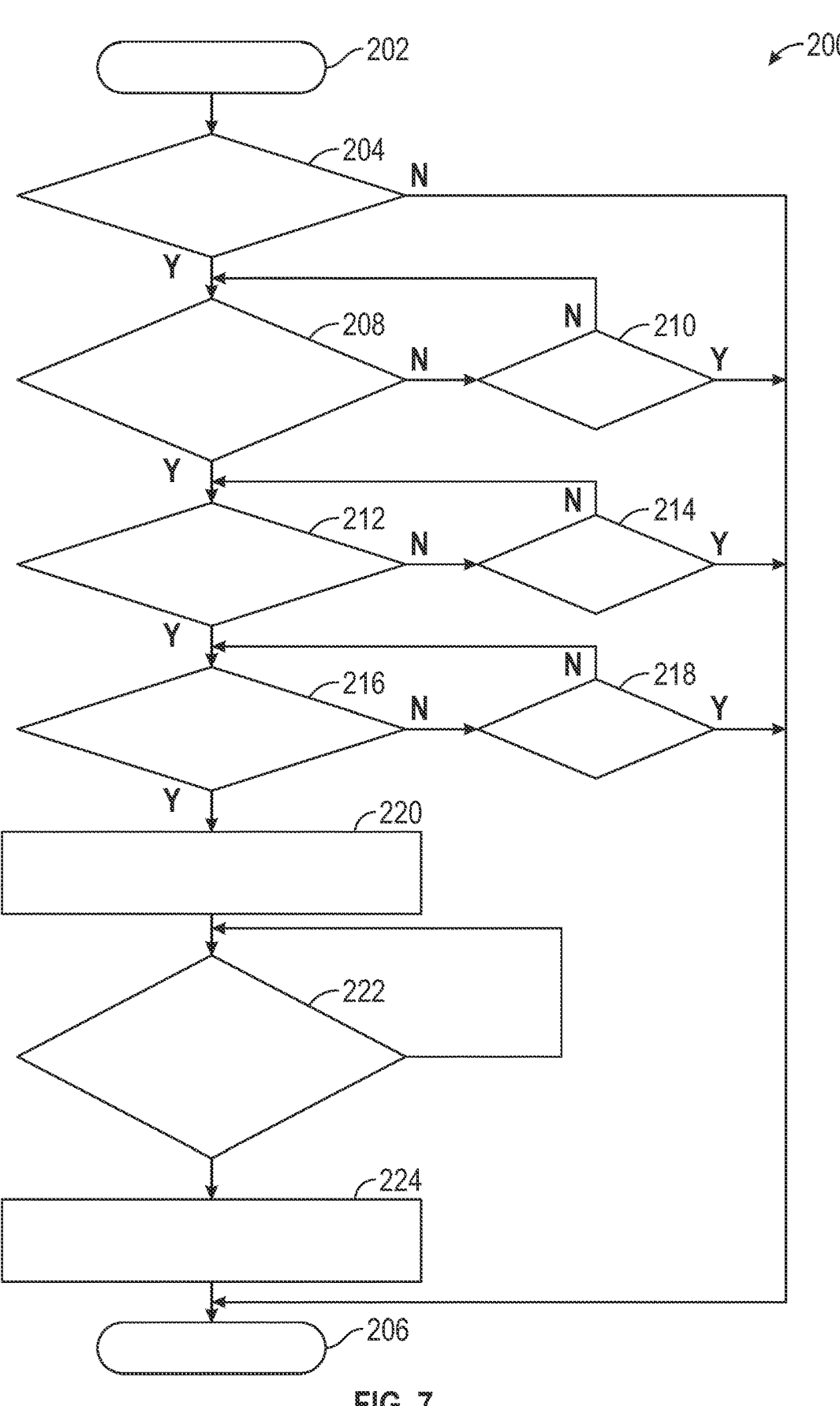
FIG. 7 is a flowchart depicting the method to provide trailer backing assistance according to an exemplary embodiment.

Turning now to FIG. 7 and with continuing reference to FIGS. 1-6, a method 200 of trailer backing assistance using the TBA 30 is shown in flowchart form. The method 200 begins at block 202. At block 204, the system 10 determines whether initialization conditions have been met. When initialization conditions have not been met, the method 200 proceeds to block 206, and the method 200 ends. However, when the initialization conditions have been met, the method 200 proceeds to block 208 where the TBA 30 initializes. More specifically, at block 208, the system 10 executes a control logic of the TBA 30 that determines whether the vehicle 12 operator has expressed a desire to back up a trailer 14. The vehicle 12 operator's intent is expressed via inputs to the TBA 30 via the HMI 46, shifting to reverse, or the like. When the vehicle 12 operator does not wish to back up the trailer 14, the method 200 proceeds to block 210. At block 210, the system 10 determines whether the vehicle 12 operator intends to cancel usage of the TBA 30. When the vehicle 12 operator does not want to use the TBA 30, the method 200 proceeds to block 206 and ends. However, when at block 210, the vehicle 12 operator expresses, via on-screen prompts via the HMI 46, or the like, that they wish to utilize the TBA 30 to back the trailer 14, the method 200 proceeds once more to block 208.

From block 208, when the vehicle 12 operator has indicated an interest in utilizing the TBA 30, the method 200 proceeds to block 212. At block 212, the TBA 30 displays, via the HMI 46, one or more prompts requesting that the vehicle 12 operator define a first goalpost 62. When the vehicle 12 operator has determined that the first goalpost 62 is incorrect or inappropriate, the vehicle 12 operator may cancel the selection of the first goalpost 62, in which case the method 200 proceeds to block 214. At block 214, the method

200 requests input, via on-screen prompts in the HMI 46, from the vehicle 12 operator to express whether the vehicle 12 operator intends to cancel usage of the TBA 30. When the vehicle 12 operator does not intend to utilize the TBA 30, the method 200 proceeds to block 206 and ends. However, when the vehicle 12 operator expresses continuing intent to utilize the TBA 30 to define the first goalpost 62, the method 200 proceeds once more to block 212. From block 212, when the vehicle 12 operator has correctly identified the first goalpost 62, the method 200 proceeds to block 216.

At block 216, the TBA 30 displays, via the HMI 46, one or more prompts requesting that the vehicle 12 operator define a second goalpost 68. When the vehicle 12 operator has determined that the first goalpost 62 is incorrect or inappropriate, the vehicle 12 operator may cancel the selection of the first goalpost 62, in which case the method 200 proceeds to block 218. At block 218, the method 200 requests input, via on-screen prompts in the HMI 46, from the vehicle 12 operator to express whether the vehicle 12 operator intends to cancel usage of the TBA 30. When the vehicle 12 operator does not intend to utilize the TBA 30, the method 200 proceeds to block 206 and ends. However, when the vehicle 12 operator expresses continuing intent to utilize the TBA 30 to define the first goalpost 62, the method 200 proceeds once more to block 220.

At block 220 the system 10 utilizes vehicle 12 sensors 32 and data from GPS satellites 33 and the V2I communications network 44 to calculate the vehicle's 12 bearing through vision-based localization. Once the system 10 is satisfied that the vehicle 12 has been localized correctly within its surroundings at the current location 58, the method 200 proceeds to block 222, where the TBA 30 presents an animation, via the HMI 46, to the vehicle 12 operator in which the vehicle 12 and trailer 14 are displayed traversing the planned path 72 from the current location 58 to the target location 54. From block 222, when the vehicle 12 operator has determined that the proposed path 72 is incorrect the vehicle 12 operator may reject the planned path 72 via an on-screen input to the HMI 46. When the vehicle 12 operator rejects the planned path, the method 200 re-generates a planned path 72 and re-presents the new planned path 72 to the vehicle 12 operator via the HMI 46. When the vehicle 12 operator accepts the planned path, via an input to the HMI 46, the method 200 proceeds to block 224.

At block 224, the TBA 30 calculates and displays, via the HMI 46, the target trailer angle reference 74, and a directional arrow 76 along with text and/or graphical instructions 78 instructing the vehicle 12 operator how to manipulate a steering wheel 80 of the vehicle 12. The system 10 continuously monitors the position of the trailer 14 relative to the vehicle 12, and dynamically adjusts the directional arrow 76 and text and/or graphical instructions 78 according to a quantity of error between the target trailer angle reference 74 and directional arrow 76 as the vehicle 12 is driven to the target location 54. Upon reaching the target location 54, the method 200 ends at block 206.

A system 10 and method 200 to provide trailer 14 backing assistance of the present disclosure offers several advantages. These include: improving trailer backing accuracy from location-to-location while utilizing preexisting hardware, reducing computational burdens, and reducing component complexity while decreasing trailer backing difficulty by providing guidance feedback to the vehicle operator, and thereby improving customer confidence and satisfaction.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for trailer backing assistance in a vehicle, the system comprising:
   a vehicle attached to a trailer by a movable hitch;
   one or more human-machine interfaces (HMIs) disposed within the vehicle;
   one or more sensors disposed on the vehicle and detecting an environment surrounding the vehicle;
   a global positioning system (GPS) including one or more GPS satellites obtaining vehicle position information;
   a remote computing system;
   a vehicle-to-infrastructure (V2I) communications network;
   one or more controllers, each of the one or more controllers having a processor, a memory, and one or more input/output (I/O) ports, the I/O ports in communication with the one or more sensors, the one or more HMIs, the GPS, and the remote computing system via the V2I communications network; the memory storing programmatic control logic; the processor executing the programmatic control logic; the programmatic control logic including a trailer backing assistance application (TBA), the TBA including programmatic control logic including:
   a first control logic that determines that a predefined set of conditions have been satisfied;
   a second control logic that obtains optical data from one or more of the one or more sensors, and the remote computing system;
   a third control logic that processes the optical data, including control logic that performs feature detection, edge detection, edge filtering, and dimensional calculations on the optical data;
   a fourth control logic that presents, via the HMI, a view of the environment surrounding the vehicle;
   a fifth control logic that prompts a vehicle operator for a first input;
   a sixth control logic that prompts the vehicle operator for a second input;
   a seventh control logic that calculates a current location of the vehicle from the optical data and from GPS vehicle position information;
   an eighth control logic that generates a planned path from the current location to a target location based on the first input and the second input;
   a ninth control logic that presents, via the HMI, an animation of the vehicle traversing the planned path; and
   a tenth control logic that, while the TBA is active, continuously displays, via the HMI, a live view of the trailer and hitch and actively and dynamically adjusts on-screen instructions that guide the vehicle operator in maneuvering the vehicle and trailer along the planned path from the current location to the target location.

2. The system of claim 1, wherein the first control logic further comprises:
   control logic that determines that a speed of the vehicle is equal to or less than five kilometers-per-hour; and
   control logic that receives confirmation, from the vehicle operator, that the TBA should be engaged.

3. The system of claim 1, wherein the fourth control logic further comprises:

control logic that presents a top-down view of the environment surrounding the vehicle based on data obtained from GPS, from optical data from the one or more sensors, and from image data stored in the remote computing system.

4. The system of claim 1, wherein the fifth control logic further comprises:

control logic that prompts the vehicle operator to select a first goalpost, wherein the first goalpost defines a first feature of the target location.

5. The system of claim 4, wherein the sixth control logic further comprises:

control logic that prompts the vehicle operator to select at least one second goalpost, wherein the at least one second goalpost defines at least one second feature of the target location, wherein the second goalpost is different from and separated from the first goalpost by a distance that is greater than a width of the vehicle and a width of the trailer.

6. The system of claim 1, wherein the seventh control logic further comprises:

control logic that calculates a current location of the vehicle from the optical data and from GPS vehicle position information; and control logic that generates the animation of the vehicle and trailer traversing the planned path.

7. The system of claim 1, wherein the eighth control logic further comprises:

control logic that presents, via the HMI, the animation of the vehicle and trailer traversing the planned path; and control logic that presents, via the HMI, a confirmation prompt to the vehicle operator, wherein in response to the confirmation prompt, the vehicle operator selectively approves the planned path.

8. The system of claim 7, further comprising:

control logic that that, upon receiving a vehicle operator response to the confirmation prompt that rejects the planned path, generates a new planned path and presents the new planned path, via the HMI, an animation of the vehicle and trailer traversing the new planned path.

9. The system of claim 8, wherein the ninth control logic further comprises:

control logic that, in response to receiving a vehicle operator response to the confirmation prompt in which the vehicle operator accepts the planned path or the new planned path, actively and continuously displays the live view of the trailer and hitch and actively and continuously displays a target trailer angle reference, a directional arrow, and the on-screen instructions that direct the vehicle operator how to manipulate a steering wheel of the vehicle, and actively and dynamically adjusts the directional arrow, the planned path, and the on-screen instructions according to a quantity of error between the target trailer angle reference and directional arrow until the vehicle and trailer have arrived at the target location.

10. A method for trailer backing assistance for a vehicle attached to a trailer by a movable hitch, the method comprising:

accessing a trailer backing assistance application via one or more human-machine interfaces (HMIs) disposed within the vehicle;

detecting an environment surrounding the vehicle with one or more sensors disposed on the vehicle;

obtaining vehicle position information from global positioning system (GPS) satellites of a GPS;

utilizing a remote computing system;

utilizing a vehicle-to-infrastructure (V2I) communications network;

executing programmatic control logic stored within a memory of one or more controllers in communication with the one or more sensors, the one or more HMIs, the GPS, and the remote computing system, via one or more input/output (I/O) ports and the V2I communications network; each of the one or more controllers having a processor, the memory, and the I/O ports; the processor executing the programmatic control logic; the programmatic control logic including a trailer backing assistance application (TBA), the TBA including control logic for:

determining that a predefined set of conditions have been satisfied;

obtaining optical data from one or more of the one or more sensors, and the remote computing system;

processing the optical data, including performing feature detection, edge detection, edge filtering, and dimensional calculations on the optical data;

presenting, via the HMI, a view of the environment surrounding the vehicle;

prompting a vehicle operator for a first input;

prompting the vehicle operator for a second input;

calculating a current location of the vehicle from the optical data and from GPS vehicle position information;

generating and presenting a planned path from the current location to a target location based on the first input and the second input; and continuously displaying, via the HMI while the TBA is active, a live view of the trailer and hitch and actively and dynamically adjusts on-screen instructions that guide the vehicle operator in maneuvering the vehicle and trailer along the planned path from the current location to the target location.

11. The method of claim 10, further comprising:

presenting, via the one or more HMIs, a top-down view of the environment surrounding the vehicle based on data obtained from GPS, from optical data from the one or more sensors, and from image data stored in the remote computing system.

12. The method of claim 11, further comprising:

determining that a speed of the vehicle is equal to or less than five kilometers-per-hour; and receiving confirmation, from the vehicle operator, that the TBA should be engaged.

13. The method of claim 11, further comprising:

prompting the vehicle operator to select a first goalpost, wherein the first goalpost defines a first feature of the target location; and prompting the vehicle operator to select at least one second goalpost, wherein the at least one second goalpost defines at least one second feature of the target location, wherein the second goalpost is different from and separated from the first goalpost by a distance that is greater than a width of the vehicle and a width of the trailer.

14. The method of claim 11, further comprising:

calculating a current location of the vehicle from the optical data and from GPS vehicle position information;

generating an animation of the vehicle and trailer traversing the planned path; and presenting, via the HMI, the animation of the vehicle and trailer traversing the planned path.

15. The method of claim 11, further comprising:

presenting, via the HMI, a confirmation prompt to the vehicle operator, wherein in response to the confirmation prompt, the vehicle operator selectively approves the planned path.

16. The method of claim 15, further comprising:

upon receiving a vehicle operator response to the confirmation prompt that rejects the planned path, generating a new planned path and presents the new planned path, via the HMI, an animation of the vehicle and trailer traversing the new planned path.

17. The method of claim 16, further comprising:

in response to receiving a vehicle operator response to the confirmation prompt in which the vehicle operator accepts the planned path or the new planned path, actively and continuously displaying the live view of the trailer and hitch and actively and continuously displays a target trailer angle reference, a directional arrow, and the on-screen instructions that direct the vehicle operator how to manipulate a steering wheel of the vehicle; and actively and dynamically adjusting the directional arrow, the planned path, and the on-screen instructions according to a quantity of error between the target trailer angle reference and directional arrow until the vehicle and trailer have arrived at the target location.

18. A method for trailer backing assistance for a vehicle attached to a trailer by a movable hitch, the method comprising:

accessing a trailer backing assistance application (TBA) via one or more human-machine interfaces (HMIs) disposed within the vehicle;

detecting an environment surrounding the vehicle with one or more sensors disposed on the vehicle;

obtaining vehicle position information from global positioning system (GPS) satellites of a GPS;

utilizing a remote computing system;

utilizing a vehicle-to-infrastructure (V2I) communications network;

executing programmatic control logic stored within a memory of one or more controllers in communication with the one or more sensors, the one or more HMIs, the GPS, and the remote computing system, via one or more input/output (I/O) ports and the V2I communications network; each of the one or more controllers having a processor, the memory, and the I/O ports; the processor executing the programmatic control logic; the programmatic control logic including the TBA, the TBA including control logic for:

determining that a predefined set of conditions have been satisfied including:

determining that a speed of the vehicle is equal to or less than five kilometers-per-hour; and receiving confirmation, from a vehicle operator, that the TBA should be engaged;

obtaining optical data from one or more of the one or more sensors, and the remote computing system;

processing the optical data including:

performing feature detection, edge detection, edge filtering, and dimensional calculations on the optical data;

presenting, via the HMI, presenting a top-down view of the environment surrounding the vehicle based on data obtained from GPS, from optical data from the one or more sensors, and from image data stored in the remote computing system;

prompting the vehicle operator for a first goalpost and at least one second goalpost, wherein the first goalpost defines a first feature of a target location, and the at least one second goalpost defines at least one second feature of the target location, wherein the second goalpost is different from and separated from the first goalpost by a distance that is greater than a width of the vehicle and a width of the trailer;

calculating a current location of the vehicle from the optical data and from GPS vehicle position information;

generating a planned path from the current location to a target location based on the first input and the second input;

generating an animation of the vehicle and trailer traversing the planned path;

presenting, via the HMI, the animation of the vehicle and trailer traversing the planned path;

prompting, via the HMI, the vehicle operator to approve the planned path, and upon receiving a vehicle operator response rejecting the planned path, generating a new planned path and presenting the new planned path, via the HMI, an animation of the vehicle and trailer traversing the new planned path; and upon receiving a vehicle operator response accepting the planned path or the new planned path, actively and continuously displaying a live view of the trailer and hitch and actively and continuously displaying a target trailer angle reference, a directional arrow, and on-screen instructions that direct the vehicle operator how to manipulate a steering wheel of the vehicle; and actively and dynamically adjusting the directional arrow, the planned path, and the on-screen instructions according to a quantity of error between the target trailer angle reference and directional arrow until the vehicle and trailer have arrived at the target location.

* * * * *